(12) United States Patent
Zhu et al.

(10) Patent No.: US 10,620,083 B2
(45) Date of Patent: *Apr. 14, 2020

(54) MEASURING SYSTEM WITH A PRESSURE DEVICE AS WELL AS METHOD FOR MONITORING AND/OR CHECKING SUCH A PRESSURE DEVICE

(71) Applicant: Endress + Hauser Flowtec AG, Reinach (CH)

(72) Inventors: Hao Zhu, Freising (DE); Alfred Rieder, Landshut (DE); Holger Bernhard, Grenzach-Wyhlen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 469 days.

This patent is subject to a terminal disclaimer.

(21) Appl. No.: 14/897,055

(22) PCT Filed: May 19, 2014

(86) PCT No.: PCT/EP2014/060191
§ 371 (c)(1),
(2) Date: Dec. 9, 2015

(87) PCT Pub. No.: WO2014/198494
PCT Pub. Date: Dec. 18, 2014

(65) Prior Publication Data
US 2016/0123836 A1 May 5, 2016

(30) Foreign Application Priority Data

Jun. 13, 2013 (DE) .................. 10 2013 106 155

(51) Int. Cl.
*G01M 5/00* (2006.01)
*G01L 1/22* (2006.01)
*G01L 5/00* (2006.01)

(52) U.S. Cl.
CPC ............ *G01M 5/0041* (2013.01); *G01L 1/22* (2013.01); *G01M 5/0058* (2013.01); *G01M 5/0066* (2013.01); *G01L 5/0071* (2013.01)

(58) Field of Classification Search
CPC .................................................. G01M 5/0041
See application file for complete search history.

(56) References Cited

U.S. PATENT DOCUMENTS 4,179,940 A    12/1979  Oertle
4,546,649 A *  10/1985  Kantor ................. G01B 7/06
                                              340/870.11
(Continued)

FOREIGN PATENT DOCUMENTS

CN         1690675 A      11/2005
CN       101730834 A       6/2010
(Continued)

OTHER PUBLICATIONS

German Search Report, German PTO, Munich, DE, dated Feb. 27, 2014.
(Continued)

*Primary Examiner* — Manuel A Rivera Vargas
(74) *Attorney, Agent, or Firm* — Bacon & Thomas, PLLC

(57) ABSTRACT

Method for monitoring and/or checking a pressure device having a lumen surrounded by a wall for conveying and/or storing a fluid. For such purpose, the method comprises a step of registering a strain, of the wall, by means of a strain gage, respectively a strain sensor formed therewith, affixed outwardly on the wall, for ascertaining a strain value representing the strain of the wall, as well as a step of using the strain value for ascertaining damage to the wall, as a result of plastic deformation of the wall and/or as a result of wear of the wall. A measuring system of the invention comprises supplementally to the pressure device at least one strain sensor affixed on a wall segment of the wall for producing (Continued)

a strain signal dependent on a time variable strain, of the wall segment as well as a transmitter electronics electrically coupled with the strain sensor. The transmitter electronics is adapted to receive the strain signal as well as with the application of the strain signal to ascertain damage to the wall.

53 Claims, 5 Drawing Sheets

(56) References Cited

U.S. PATENT DOCUMENTS

| | | | |
|---|---|---|---|
| 5,926,096 | A | 7/1999 | Mattar |
| 7,284,437 | B2 | 10/2007 | Kippner |
| 7,966,895 | B2 | 6/2011 | Kuttler |
| 2008/0141789 | A1 | 6/2008 | Kassubek |
| 2012/0123705 | A1 | 5/2012 | Drahm |
| 2012/0259559 | A1* | 10/2012 | Jeeves ................ E21B 41/0007 702/51 |
| 2013/0092243 | A1 | 4/2013 | Mohammed |

FOREIGN PATENT DOCUMENTS

| | | |
|---|---|---|
| CN | 102187187 A | 9/2011 |
| EP | 0816807 A2 | 1/1998 |
| EP | 0855684 A2 | 7/1998 |
| JP | S58211625 A | 12/1983 |
| JP | 2009041924 A | 2/2009 |
| JP | 2013117459 A | 6/2013 |

OTHER PUBLICATIONS

International Search Report, EPO, The Netherlands, dated Aug. 12, 2014.
English Translation of the International Preliminary Report on Patentability, WIPO, Geneva, CH, dated Dec. 23, 2015.

* cited by examiner

US 10,620,083 B2

MEASURING SYSTEM WITH A PRESSURE DEVICE AS WELL AS METHOD FOR MONITORING AND/OR CHECKING SUCH A PRESSURE DEVICE

TECHNICAL FIELD

The invention relates to a method for monitoring and/or checking a pressure device having a lumen surrounded by a wall, for example, a metal wall, namely a device for conveying and/or storing in said lumen a fluid, for example, a gas, a liquid or a flowable dispersion, acting nominally with a static positive pressure, respectively a pressure of greater than 1 bar, on the wall. Moreover, the invention relates to a measuring system (especially a measuring system suitable for implementing said method) for ascertaining a measured variable, for example, a fluid dynamic and/or thermodynamic, measured variable, such as e.g. measured values representing a volume flow rate, a mass flow rate, a density, a viscosity, a pressure or a temperature of a fluid, which measuring system comprises such a pressure device.

BACKGROUND DISCUSSION

Pressure devices, for example, also such subject to the "Guideline 97/23/EH of the European Parliament and the Advisory of 29 May 1997 for equalizing the laws and regulations of the member states concerning pressure devices" or corresponding national laws and regulations—, at times, also referred to as pressure device guidelines—, such as, for instance, the "Fourteenth enactment of the product safety law" (14. ProdSV) or the "ASME Boiler and Pressure Vessel Code" (ASME U-Stamp), find varied application in industrial settings, not least of all also in industrial measuring- and automation technology, for example, in the form of tanks for liquefied gas, autoclaves or other containers for accommodating, respectively storing, fluids under increased pressure relative to the surrounding atmosphere, in the form of pipelines suitable for the transport of such fluids under increased pressure or also in the form of plants formed by means of such containers and/or pipelines, consequently such regularly operated with increased operational pressures. To be mentioned as other representatives of such pressure devices are additionally measuring transducers communicating with the aforementioned pipelines, respectively containers, consequently contacted by fluid guided therein, respectively also flowed through by the fluid, for generating a measurement signal corresponding to a measured variable to be registered for the fluid, respectively measuring systems formed by means of such measuring transducers and transmitter electronics electrically connected therewith, such as e.g. Coriolis, mass flow, measuring device, vortex, flow measuring devices or also ultrasonic, flow measuring devices or measuring apparatuses formed therewith, not least of all also such, in the case of which the lumen of the pressure device is formed by means of a tube arrangement having at least one measuring tube conveying fluid during operation. Examples of such pressure devices, regularly also being subject to one or more the aforementioned laws or regulations and/or embodied as measuring systems for fluids standing at least, at times, under high pressure of over 50 bar, are described, among other things, in European Patents, EP A 816 807, EP A 919 793, and EP A 1 001 254, US A 2001/0029790, US A 2004/0261541, US A 2005/0039547, US A 2006/0266129, US A 2007/0095153, US A 2007/0234824, US A 2008/0141789, US A 2011/0113896, US A 2011/0161018, US A 2011/0219872, US A 2012/0123705, U.S. Pat. No. 4,680,974, and Published International Applications WO A 2005/050145, WO A 2009/134268, WO A 90/15310, WO A 95/16897, WO A 96/05484, WO A 97/40348, WO A 98/07009 or WO A 99/39164.

The measuring systems disclosed therein are each formed by means of a measuring transducer of vibration-type insertable into the course of a pipeline and flowed-through by fluid during operation, wherein each of the measuring transducers comprises a tube arrangement formed by means of at least one, essentially straight or at least sectionally curved, e.g. U-, or V-shaped, measuring tube, in such a manner that wall and lumen are also, in each case, formed by means of the at least one measuring tube and the lumen communicates during operation with a lumen of the connected pipeline.

In operation of the pressure device, respectively the measuring system formed therewith, the at least one measuring tube is actively excited to execute mechanical oscillations for the purpose of generating oscillation signals influenced by the through flowing fluid, for example, by its mass flow rate, its density and/or its viscosity, and serving, in each case, also as measurement signal of the measuring transducer. Other examples of such measuring systems formed by means of a pressure device are described, among other things, also in U.S. Pat. Nos. 5,796,011, 7,284,449, 7,017,424, 6,910,366, 6,840,109, 5,576,500, 6,651,513, US A 2005/0072238, US A 2006/0225493, US A 2008/0072688, US A 2011/0265580, and Published International Applications, WO A 2004/023081, WO A 2006/009548, WO A 2008/042290, WO A 2007/040468 or WO A 2013/060659.

Each of the measuring transducer includes additionally a measuring transducer housing surrounding the tube arrangement, namely a measuring transducer housing forming a cavity accommodating the tube arrangement as well as, formed on the measuring transducer housing, respectively integrated therein, an inlet-side connecting flange as well as an outlet-side connecting flange for connecting the tube arrangement with the pipeline. For the case, in which the tube arrangement, consequently the lumen, is formed by means of two or more measuring tubes, the measuring tubes are most often inserted into the pipeline to form flow paths for parallel flow via a flow divider extending on the inlet side between the measuring tubes and the inlet-side connecting flange as well as via a flow divider extending on the outlet side between the measuring tubes and the outlet-side connecting flange. The measuring transducer housing serves besides for holding the tube arrangement placed within the cavity formed by the measuring transducer housing, especially, also to protect such as well as other internally lying components, for example, a sensor arrangement of the measuring transducer, against external, environmental influences, such as e.g. dust or water spray, consequently to provide a cavity as hermetically sealed as possible. Particularly in the case of pressure devices of the type being discussed, the user can, moreover, at times, also require of the measuring transducer housing that it in the case of an unsealed or bursting tube arrangement can withstand the static internal pressure within the cavity lying most often significantly over the atmospheric, external pressure at least for a predetermined time leak-free. Consequently, the measuring transducer housing must have a certain pressure resistance; compare, for this, also the above mentioned US A 2006/0266129, US A 2005/0039547, US A 2001/0029790, Published International Application WO A 90/15310, EPA 1 001 254, respectively the international patent application PCT/EP2012/070924. Particularly for applications with toxic or easily flammable fluids, the measuring transducer housing must, in such case, at times, also be able to fulfill the requirements placed on safety containers.

Measuring systems of the type being discussed, consequently pressure devices formed therewith, are additionally usually connected with one another and/or with corresponding electronic controllers by means of a—wired and/or radio-based—data transmission network provided within the superordinated data processing system, for example, programmable logic controllers (PLC) installed on-site or with stationary process-control computers in a remote control room, where the measured values produced by means of the measuring system and digitized and correspondingly encoded in suitable manner are forwarded. By means of process-control computers, using correspondingly installed software components, the transmitted measured values can be further processed and visualized as corresponding measurement results e.g. on monitors and/or converted into control signals for other field devices embodied as actuating devices, such as e.g. magnetic valves, electric motors, etc. Accordingly, the data processing system serves usually also to condition the measured value signal delivered from the transmitter electronics in a manner corresponding to the requirements of downstream data transmission networks, for example, suitably to digitize the measured value signal and, in given cases, to convert it into a corresponding telegram, and/or to evaluate it on-site. For such purpose, there are provided in such data processing systems, electrically coupled with the respective connecting lines, evaluating circuits, which pre- and/or further process as well as, in case required, suitably convert, the measured values received from the respective transmitter electronics. Serving for data transmission in such industrial data processing systems, at least sectionally, are fieldbusses, especially serial fieldbusses, such as e.g. FOUNDATION FIELDBUS, CAN, CAN-OPEN RACKBUS-RS 485, PROFIBUS, etc., or, for example, also networks based on the ETHERNET-standards as well as the corresponding, most often application independent, standardized transmission-protocols.

Pressure devices of the type being discussed can during operation be exposed, at times, to increased loadings, in given cases, also loadings above earlier agreed limit values, consequently loadings damaging to the integrity of the pressure device, be it through undesired overloadings as regards the operating pressure, through the occurrence of undesired inhomogeneities in a fluid having, in given cases, also high flow velocities of greater than 10 $ms^{-1}$, for example, in the form of solid particles entrained in the flowing fluid and/or gas bubbles entrained in liquid carrier medium, and/or undesired thermal overloading, for example, as a result of too high temperatures of the respective fluid and/or unfavorable time temperature curves, along with spatial temperature distributions unfavorable to the integrity of the pressure device. As a result of such loadings, respectively overloadings, the wall of the pressure device can be partially so damaged—, for instance, as a result of plastic deformation of the wall and/or as a result of wear of the wall, namely as a result of removal of material from the surface facing the lumen —, that the pressure device has a pressure resistance lessened in comparison to an original, respectively nominal, pressure resistance; this, for example, also in such a manner that damage of the wall within a very short time can exceed a critical damage earlier set for the respective pressure device. The critical damage of the wall can, for example, correspond to a damage specifically ascertained for the respective type, respectively the particular series of the pressure device, damage which, in given cases, also requires immediate inspection of the respective pressure device, and/or which corresponds to lessened remaining life of the particular pressure device requiring an immediate, respectively extraordinary, replacement of the pressure device.

For the mentioned case, in which the pressure device is a measuring transducer, respectively a component of a measuring system, the critical damage set for the respective pressure device can also correspond to a lessened accuracy of measurement of the measuring system resulting from such damage, respectively to a, in given cases, no longer tolerable, increased systematic measuring error in the case of generating the measurement signal, for example, as a result of damage to the respective at least one measuring tube. Of special interest, in such case, are also such measuring systems, in the case of which, such as already mentioned, the pressure device is formed by means of a measuring transducer of vibration-type. On the one hand, their respective measuring tubes are most often embodied as thin walled as possible, in order to achieve an as high as possible sensitivity of their oscillation signals, especially as regards the mass flow rate, respectively density, of the respective fluid to be measured. Consequently, the tube arrangement of such a measuring transducer has usually walls with a comparatively small, namely only low, respectively minimal, allowable safety reserves as regards wall thicknesses providing the pressure resistance. On the other hand, of interest, however, can also be even small damage to the wall, namely damage not yet sinking the pressure resistance of the tube arrangement, respectively of the pressure device formed therewith, to an unallowable low measure, because, such as, among other things, also discussed in the above mentioned EP-A 816 807, WO-A 2005/050145, WO-A 99/39164, WO-A 96/05484, US-A 2007/0095153, respectively US-A 2012/0123705, also such damage, arising distributed most often also spatially rather non-uniformly over the tube arrangement can have considerable effects on the accuracy of measurement of the measuring system, not least of all also those measuring systems with which the mass flow rate, respectively the density, are measured.

Methods, respectively measuring systems with measuring apparatuses, which are suitable, as early as possible, to detect, respectively to be able to predict, undesirably, respectively unallowably high, damage of the aforementioned type to such pressure devices formed by means of measuring transducers of vibration-type, respectively to be able to estimate quantitatively an extent such damage, are described, among other things, in the above mentioned US A 2007/0095153, US A 2006/0266129; European Patent; EP A 816 807, US A 2012/0123705, and Published International Applications, WO A 2005/050145, WO A 96/05484 or WO A 99/39164. Fundamentally, the therein disclosed methods operate based on the evaluation of oscillation signals delivered by means of the measuring transducers during operation, in given cases, also by additional taking into consideration of exciter signals effecting the respective oscillations of the at least one measuring tube. Although these methods, respectively measuring arrangements, in the case of measuring systems, respectively pressure devices, formed by means of measuring transducers of vibration-type can be used very advantageously, respectively applied also in increasing measure, a disadvantage of such methods, respectively measuring arrangements, is to be seen in the fact that they operate based on measurement signals—here the oscillation signals specific for such measuring systems and, thus, are applicable exclusively for such measuring systems, consequently actually only for a relatively small part of the totality of pressure devices. Additionally, the mentioned methods, respectively measuring arrangements, can, at times, also have certain cross sensitivities to measured variables, not least of all to the above referenced measured variables, mass flow rate, density and/or viscosity, representing other than the actual damage, and these cross sensitivities must be correspondingly compensated, be it by applying in the measuring system supplementally provided sensor systems and/or from measured values supplementally ascertained externally of the measuring system, in order reliably to ascertain alarmable damage of the wall, respectively to be able safely to prevent false alarms.

SUMMARY OF THE INVENTION

Taking the above into consideration, an object of the invention is to provide a method, respectively a corresponding measuring system, by means of which, also without application of oscillation signals representing vibrations of the respective wall, the wall of a pressure device of the type being discussed, consequently also a pressure device without measuring transducers of vibration-type, can be examined for possible damage—respectively, conversely, for its structural integrity—, and by means of which even small structural changes of the respective wall, e.g. a lessening of the wall thickness as a result of wear or plastic deformation of the wall, can be reliably detected, respectively reported very early.

For achieving the object, the invention resides in a method for monitoring and/or checking a pressure device having a lumen surrounded by a wall, for example, a metal wall, namely a device for conveying and/or storing a fluid, for example, a gas, a liquid or a flowable dispersion, in the lumen, for example, a fluid acting nominally with a static pressure of greater than 1 bar on the wall, which method comprises the steps as follows: registering a strain of the wall, for example, a time variable strain of the wall and/or a strain of the wall dependent on a static internal pressure reigning within the lumen, for ascertaining a strain value representing strain of the wall; as well as using the strain value for ascertaining damage to the wall, for example, damage influencing pressure resistance of the pressure device and/or co-determining remaining life of the pressure device and/or exceeding an earlier set, critical damage to the wall of the pressure device, for example, as a result of plastic deformation of the wall and/or as a result of wear of the wall.

Moreover, the invention resides in a measuring system, for example, also a measuring system suitable for implementing the method of the invention, for ascertaining measured values representing at least one measured variable, for example, a fluid dynamic and/or thermodynamic, measured variable, (e.g. volume flow rate, mass flow rate, density, viscosity, pressure, temperature, etc.) of a fluid (e.g. gas, liquid, flowable dispersion). The measuring system of the invention comprises: a pressure device having a lumen surrounded by a wall, for example, a metal wall, namely a device for conveying and/or storing a fluid in said lumen, for example, a fluid acting nominally with a pressure of greater than 0.5 bar on the wall; at least one strain sensor affixed on a wall segment of the wall, for example, a metal wall segment, for example, a strain sensor formed by means of a strain gage, for producing a strain signal dependent on a time variable strain of the first wall segment, for example, a strain signal having an electrical voltage dependent on said strain and/or an electrical current dependent on said strain; as well as a transmitter electronics electrically coupled with the strain sensor. Said transmitter electronics is additionally adapted to receive the strain signal as well as with application of the strain signal to ascertain damage to the wall, for example, damage lessening a pressure resistance of the pressure device and/or co-determining a remaining life of the pressure device and/or resulting from plastic deformation of the wall and/or wear of the wall, for example, namely to ascertain a damage value representing a characterizing number value for a damage characterizing number quantifying damage to the wall.

In a first embodiment of the method of the invention, such further comprises a step of using a measured value of pressure representing a static internal pressure reigning within the lumen for ascertaining damage to the wall. Developing this embodiment of the invention further, the method comprises, additionally, a step of registering the static internal pressure reigning within the lumen, for example, relative to an ambient pressure acting externally on the wall, for ascertaining the pressure measured value. Said registering of the static internal pressure reigning within the lumen can occur, for example, by applying a pressure sensor inserted into the wall, especially upstream of the wall segment.

In a second embodiment of the method of the invention, such further comprises a step of generating a warning report, especially by applying the strain value, which warning report signals, for example, visually and/or acoustically perceivably, a critical damage to the wall, for example, damage to the wall corresponding to an earlier established maximum allowable damage for the pressure device and/or damage requiring an inspection of the pressure device.

In a third embodiment of the method of the invention, such further comprises a step of generating a warning report, especially by applying the strain value, which warning report signals, for example, visually and/or acoustically perceivably, a critical damage to the wall, for example, damage to the wall corresponding to an earlier fixed maximum allowable damage for the pressure device and/or damage requiring an inspection of the pressure device, as well as a step of using a pressure measured value representing a static internal pressure reigning within the lumen for ascertaining damage to the wall, in such a manner that for generating the warning report, for example, also the pressure measured value can be used, respectively both the strain value as well as also the pressure measured value can be used.

In a fourth embodiment of the method of the invention, the step of ascertaining damage to the wall comprises a step of using the strain value for ascertaining a deviation of the strain value from an earlier ascertained reference value, for example, a reference value for the pressure device with undamaged wall or for an equally constructed, other pressure device. The reference value can be ascertained, for example, by applying a pressure measured value representing a static internal pressure reigning within the lumen.

In a fifth embodiment of the method of the invention, the step of ascertaining damage to the wall comprises a step of using the strain value for ascertaining a damage value, namely a characterizing number value for a damage characterizing number quantifying damage to the wall, for example, a damage characterizing number representing a deviation of the strain difference from an earlier ascertained reference value. Developing this embodiment of the invention further, it is, additionally, provided that the step of ascertaining damage to the wall comprises a step of using the damage value, for example, in such a manner that the damage value is compared with a predetermined threshold value. The damage value can represent a deviation, for example, a relative or absolute deviation, of the strain value from an ascertained reference value therefor, for example, a reference value ascertained earlier for the pressure device with undamaged wall or earlier for an equally-constructed, other pressure device. Alternatively or supplementary to this further development, the method of the invention further comprises a step of generating a warning report, especially by applying the strain value, which warning report signals, for example, visually and/or acoustically perceivably, a critical damage to the wall, for example, damage the wall corresponding to a earlier fixed maximum allowable damage for the pressure device and/or damage requiring an inspection of the pressure device and it is, furthermore, provided that the step of generating the warning report comprises a step of comparing the damage value with a predetermined threshold value, for example, a threshold value earlier set for the pressure device and representing critical damage to the wall.

In a sixth embodiment of the method of the invention, such further comprises a step of ascertaining a strain desired value representing a nominal strain of the wall. Said strain desired value can then be used, for example, for ascertaining a damage value, namely a characterizing number value for a damage characterizing number quantifying damage to the wall, for example, a damage characterizing number representing deviation of the strain difference from an earlier ascertained reference value. Developing this embodiment of the invention further, it is, additionally, provided that the step of ascertaining the strain desired value comprises a step of using a measured value of pressure representing a static internal pressure reigning within the lumen. Alternatively or supplementally, it is, furthermore, provided that the method additionally comprises a step of using the strain value as well as the strain desired value for ascertaining a strain deviation value representing a discrepancy between the strain of the wall and the nominal strain. The strain deviation value can be used, furthermore, for ascertaining damage to the wall.

In a seventh embodiment of the method of the invention, the step of ascertaining damage to the wall comprises a step of registering a temperature of the wall, for example, on a side of the wall facing away from the lumen.

In an eighth embodiment of the method of the invention, such further comprises a step of modifying a pressure difference existing between a static internal pressure reigning within the lumen and an ambient pressure acting externally on the wall for elastically deforming at least portions of the wall, namely at least one wall segment of the wall. Developing this embodiment of the invention further, it is, additionally, provided that the step of changing the pressure difference comprises a step of increasing the static internal pressure to a pressure value, which is greater than the ambient pressure, for example, by greater than 0.5 bar, and/or that the step of changing the pressure difference comprises a step of allowing flowing in of fluid into the lumen of the pressure device, and/or that the step of changing the pressure difference comprises a step of allowing flow of fluid through the lumen of the pressure device, and/or that the step of changing the pressure difference comprises a step of allowing flow of fluid from the lumen of the pressure device.

In a ninth embodiment of the method of the invention, the pressure device further comprises a measuring transducer, for example, a measuring transducer of the vibration-type, which measuring transducer is adapted to register at least one measured variable, for example, a fluid dynamic or thermodynamic, measured variable, for example, a volume flow rate, a mass flow rate, a density, a viscosity, a pressure or a temperature of the fluid and to transduce such into at least one measurement signal, for example, an electrical, measurement signal, corresponding to the measured variable. Developing this embodiment of the invention further, it is, additionally, provided that the pressure device comprises electrically coupled with the measuring transducer a transmitter electronics, which is adapted to receive the at least one measurement signal and, by applying the measurement signal, to ascertain at least one measured value, which represents the at least one measured variable. Furthermore, it is provided that the step of ascertaining damage to the wall is executed by applying the transmitter electronics. Alternatively or supplementally, it is, furthermore, provided that the measuring transducer has a tube arrangement, formed, for example, by means of at least one tube, for conveying the flowable medium, and that the lumen of the pressure device is formed by means of the tube arrangement, for example, in such a manner that the tube arrangement includes the wall segment.

In a tenth embodiment of the method of the invention, is furthermore, provided that the pressure device comprises a pipeline.

In an eleventh embodiment of the method of the invention, it is furthermore, provided that the pressure device comprises a tank.

In a twelfth embodiment of the method of the invention, it is furthermore, provided that the pressure device comprises a boiler, for example, an autoclave.

In a thirteenth embodiment of the method of the invention, such further comprises a step of allowing flowing in of fluid into the lumen of the pressure device, for example, for increasing a static internal pressure reigning within the lumen to a higher pressure value in comparison with the ambient pressure.

In a fourteenth embodiment of the method of the invention, such further comprises a step of allowing flow of fluid through the lumen of the pressure device, for example, for increasing a static internal pressure reigning within the lumen to a higher pressure value in comparison with the ambient pressure.

In a fifteenth embodiment of the method of the invention, such further comprises a step of allowing flow of fluid from the lumen of the pressure device.

In a sixteenth embodiment of the method of the invention, such further comprises a step of producing a first strain signal dependent on a time variable strain of the wall segment, for example, having an electrical voltage dependent on the strain and/or an electrical current dependent on the strain. Developing this embodiment of the invention further, it is, additionally, provided that the method further comprises a step of using a strain gage affixed on the wall segment for producing the first strain signal and/or a step of using the strain signal for ascertaining the strain value, for example, in such a manner that for ascertaining the strain value from the strain signal at least one parameter measured value is ascertained for a signal parameter characterizing the strain signal, such as e.g. an instantaneous value of the strain signal and/or an effective value (RMS) or another location parameter of the strain signal and/or a variance of the strain signal and/or another scatter parameter of the strain signal.

In a first embodiment of the measuring system of the invention, it is furthermore, provided that the transmitter electronics is adapted, by applying the strain signal, generate a strain value representing strain of the wall, and that the transmitter electronics is adapted, by applying the strain value, to ascertain damage to the wall. Developing this embodiment of the invention further, it is, additionally, provided that the transmitter electronics is adapted, for generating the strain value, ascertain for a signal parameter characterizing the strain signal, for example, a signal parameter such as an instantaneous value, an effective value (RMS) and/or another location parameter and/or a variance and/or another scatter parameter, recurringly, a parameter measured value quantifying the signal parameter, for example, in such a manner that the transmitter electronics ascertains a parameter measured value of at least one location parameter for the strain signal, for example, an instantaneous value, respectively an effective value (RMS), and/or at least a scatter parameter, for example, a variance, and uses such for generating the strain value.

In a second embodiment of the measuring system of the invention, it is furthermore, provided that the transmitter electronics is adapted, based on the strain signal—, for example, by applying a strain value ascertained based on the strain signal and representing strain of the wall segment—to generate a warning report signaling, for example, visually and/or acoustically perceivably, the damage. For example, the transmitter electronics can, in such case, also be adapted to generate the warning report, in case a damage value ascertained based on the strain signal exceeds a predetermined threshold value—, for example, a threshold value representing for the pressure device an earlier established, critical damage to the wall.

In a third embodiment of the measuring system of the invention, it is, furthermore, provided that the transmitter electronics is adapted, based on the strain signal, to ascertain a damage value, namely a characterizing number value for a damage characterizing number quantifying an instantaneous damage to the wall. Developing this embodiment of the invention further, it is, additionally, provided that the damage value represents a, for example, relative or absolute, deviation of the strain value from a reference value ascertained therefor, for example, earlier on the pressure device with undamaged wall or earlier on an equally-constructed, other pressure device. Alternatively thereto or in supplementation thereof, the transmitter electronics is, furthermore, adapted to compare the damage value with a predetermined threshold value for ascertaining damage to the wall.

In a fourth embodiment of the measuring system of the invention, it is, furthermore, provided that the pressure device has a measuring transducer, for example, a measuring transducer of vibration-type, having a tube arrangement formed by means of at least one, for example, at least sectionally curved, tube for conveying the fluid, which measuring transducer is adapted to deliver at least one measurement signal, for example, an electrical, measurement signal, corresponding to the measured variable and that the lumen of the pressure device formed by means of the tube arrangement. Developing this embodiment of the invention further, it is, additionally, provided that the at least one strain sensor is affixed on the at least one tube of the tube arrangement, consequently the tube arrangement includes the wall segment, and/or that the tube arrangement of the measuring transducer has at least two tubes, especially tubes for parallel flow and/or four, and/or equally constructed, tubes.

In a fifth embodiment of the measuring system of the invention, it is, furthermore, provided that the transmitter electronics is adapted to ascertain damage to the wall by applying a measured value of pressure representing a static internal pressure reigning within the lumen. Developing this embodiment of the invention further, it is, additionally, provided that the measuring system further comprises a pressure sensor for ascertaining the measured value of pressure, for example, a pressure sensor inserted into the wall upstream of the wall segment.

In a sixth embodiment of the measuring system of the invention, it is, furthermore, provided that the transmitter electronics is electrically coupled with the measuring transducer. Developing this embodiment of the invention further, it is, additionally, provided that the transmitter electronics is adapted to receive the at least one measurement signal as well as, by applying the measurement signal, to acertain a measured value, which represents a physical, for example, fluid dynamic and/or thermodynamic, measured variable, for example, a volume flow rate, a mass flow rate, a density, a viscosity, a pressure or a temperature, of the fluid, and/or that the transmitter electronics is adapted to deliver at least one electrical driver signal for driving the measuring transducer, for example, an electrical driver signal inducing in the measuring transducer a measurable effect corresponding to the at least one measured variable.

A basic idea of the invention is to check, respectively to monitor, pressure devices of the type being discussed for structural integrity by recurringly registering a strain of at least one wall segment of the respective enveloping wall of the fluid conveying lumen. Based on continuous, or in predetermined time intervals recurring, observation of the at least one locally registered strain, respectively time curves of strain, for instance, based on a strain signal generated by means of a strain sensor placed on the respective wall segment, and with application of a transmitter electronics electrically coupled with the strain sensor, possible damage to the wall of the pressure device, be it in the form of wear caused by material removal or in the form of plastic deformation due to possible overloading, can be recognized, very rapidly. In the case of significant, namely over a predetermined measure of tolerance, deviation of the registered strain from a predetermined reference value lying outside a predetermined tolerance range, a corresponding damage to the wall can be deduced.

Such a deviation of strain can by applying the aforementioned strain signals additionally also be converted by means of the aforementioned transmitter electronics into a damage value corresponding to a characterizing number value for a damage characterizing number quantifying the instantaneous damage to the wall, for example, by ascertaining one or more parameter values for one or more signal parameters characterizing the strain signal. Serving as damage value can be e.g. an absolute or relative deviation of parameter values instantaneously representing the respective signal parameters from an earlier ascertained reference value, for example, for the pressure device with undamaged wall or for an equally constructed, other pressure device.

With knowledge of the extent such damage, by corresponding comparison with reference data earlier ascertained for the pressure device, it can, furthermore, also be detected, whether further operation of the pressure device is still directly possible, not least of all also without that a degrading of other plant regions or even an endangering of persons or environment would be experienced, by evaluating returned observations, respectively a time curve of damage, also a rate with which the damage is increasing, can be ascertained, for example, in order, based thereon, to estimate a remaining life probably remaining for the respective pressure device, respectively, conversely, to predict a point in time of the reaching of an earlier fixed critical damage to the wall for the pressure device, consequently be able to discover, early, impending dangerous situations as a result of a lessened pressure resistance.

The invention is based, in such case, among other things, on the recognition that the wall component of pressure devices of the type being discussed is typically non-uniformly damaged in the course of operation, in such a manner that the wall has wall segments, which in comparison to other wall segments wear significantly faster, respectively, in the same observation time span, appear to wear more strongly, than the remaining wall, so that, in the case of corresponding arrangement of the strain sensor and definition of the respective reference value, incidental damage to the wall, respectively overloadings of the wall bringing about such, for instance, as a result of a too high operating pressure, can be recognized.

The invention as well as other advantageous embodiments and utilities thereof will now be explained in greater detail based on examples of embodiments shown in the figures of the drawing. Equal parts are provided in all figures with equal reference characters. When perspicuity requires or it otherwise appears sensible, reference characters already appearing in antecedent figures are omitted in subsequent figures. Other advantageous embodiments or further developments, especially also combinations, of initially only individually explained aspects of the invention, will become evident, furthermore, from the figures of the drawing, as well as also from the dependent claims per se.

DETAILED DISCUSSION IN CONJUNCTION WITH THE DRAWINGS

Figure 1:
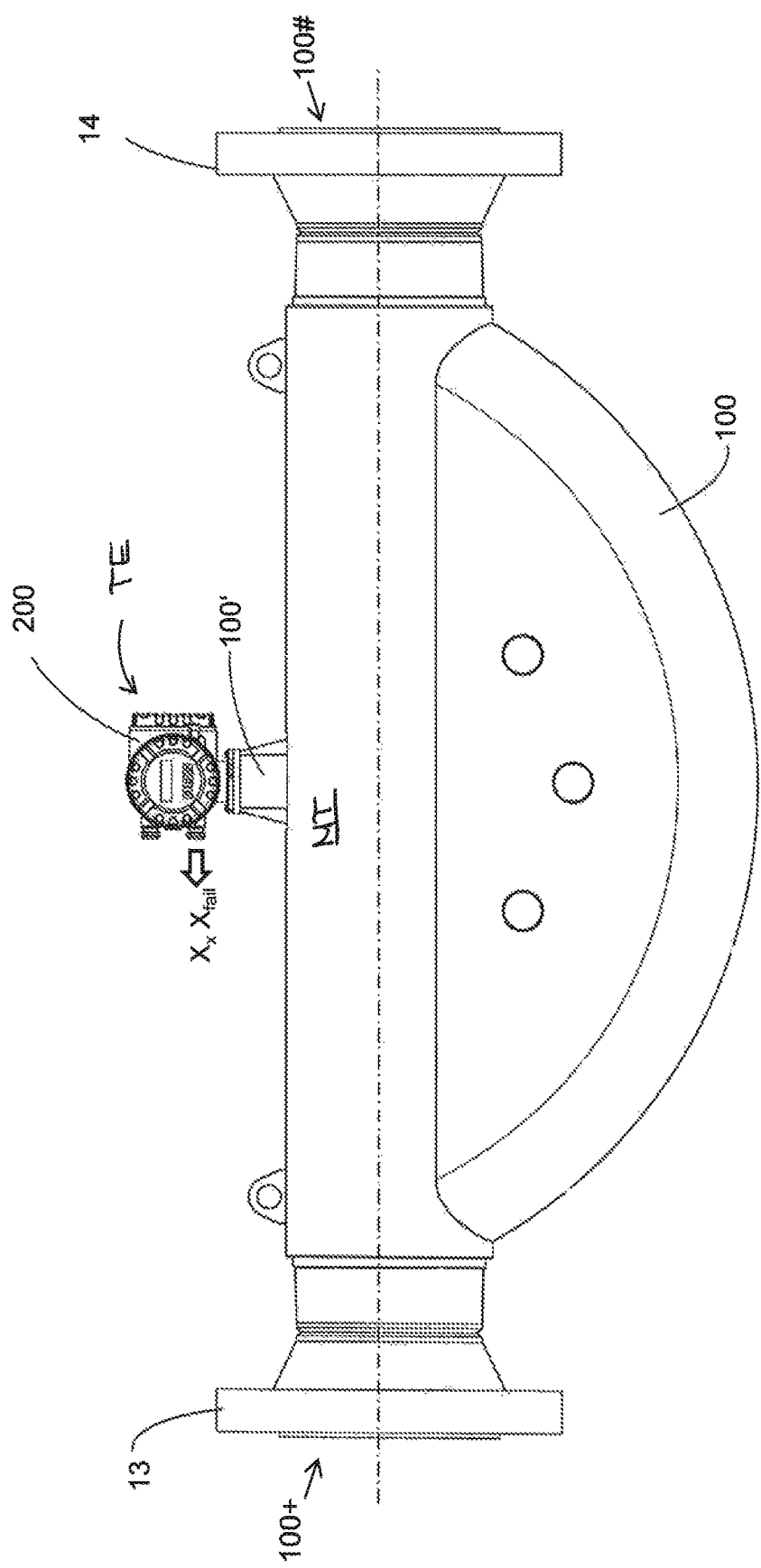
FIGS. 1 and 2 a pressure device shown in different views and embodied as an in-line measuring device.
Figure 2:
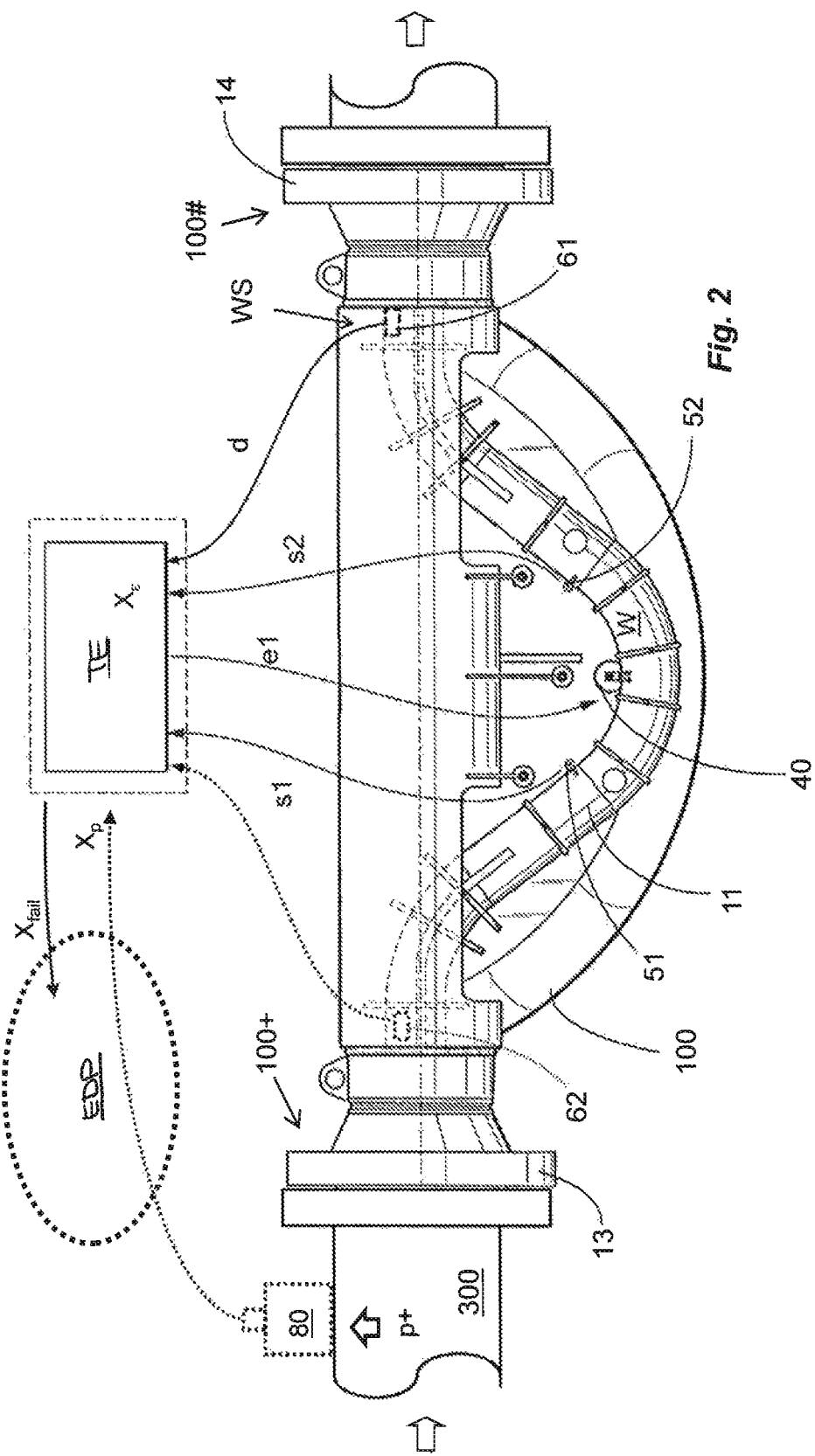

Shown schematically In FIGS. 1 and 2 is an example of an embodiment of a pressure device. The pressure device is provided for conveying, respectively for holding ready for a certain period of time, in a lumen surrounded by a wall W, for example, a metal wall, —here extending from an inlet end 100+ to an outlet end 100#—a fluid, for example, a gas, a liquid or a flowable medium, for instance a fluid dispersion, in given cases, also a dispersion first formed in the course of the flow by cavitation or precipitation, such as a e.g. a foam, a suspension or an aerosol. Especially, the pressure device is, furthermore, adapted and designed to convey in the lumen a fluid acting on the wall W nominally with a static pressure of greater than 1 bar, especially also greater than 10 bar, manufactured, for example, of a stainless steel, a titanium alloy and/or a zirconium-alloy, consequently in the case of intended use to be able to withstand static pressures of greater than 1 bar at least for a predetermined nominal lifetime. The pressure device can comprise, for example, a pipeline, a tank, a boiler, especially also an autoclave, and/or a measuring tube, respectively a measuring chamber, of a measuring device, for example, a flow measuring device.

The here representatively shown pressure device is formed by means of an in-line measuring device, namely a measuring system insertable into the course of a pipeline 300. During operation, at least at times, fluid guided in the pipeline flows through it in such a manner that the fluid first flows into the lumen at the inlet end 100+, flows in a flow direction through the lumen and then leaves the lumen at the outlet end 100#. Said measuring system, consequently the therewith formed pressure device, is, especially, adapted, recurringly to ascertain measured values $X_x$ for at least one, for example, fluid dynamic and/or thermodynamic, measured variable x, such as, for instance, a volume flow rate v, a mass flow rate m, a density $\rho$, a viscosity $\eta$, a pressure p or a temperature $\theta$, of the respective fluid flowing through the lumen. The fluid conveying lumen, consequently the wall W surrounding such, is in the case of the pressure device formed in the shown example of an embodiment, namely, for example, as a Coriolis, mass flow, measuring device, density measuring device and/or viscosity measuring device, formed by means of a tube arrangement of the measuring transducer MT (here accordingly embodied as a measuring transducer of vibration-type) having at least one—here sectionally curved—tube 11. In advantageous manner, the tube arrangement, consequently the therewith formed pressure device, is so optimized in the case of a fluid, for example, thus water, flowing in the flow direction through the lumen with an average flow velocity of 10 $ms^{-1}$, a density of 1000 kg $m^{-3}$, respectively a viscosity of 1 cP from the inlet end 100+ to the outlet end 100#, that the fluid experiences a pressure loss of less than bar. Such pressure devices formed by means of a measuring transducer are manufactured and sold by the applicant, for example, as measuring systems working according to the Coriolis principle for measuring mass flow rates under the marks "PROMASS A", "PROMASS E", "PROMASS F", "PROMASS H", "PROMASS I", "PROMASS O", "PROMASS P", "PROMASS S", "PROMASS X" (http://www.de.endress.com/#product/Coriolis).

The measuring transducer serves here, among other things, for registering the at least one measured variable in such a manner that the measuring transducer in interaction with the fluid guided in the lumen generates at least one measurement signal s1, for example, an electrical measurement signal, dependent on the at least one measured variable. In operation of the measuring system shown here, the at least one tube 11 of the measuring transducer serving as measuring tube for the purpose of generating the at least one measurement signal is excited by means of an oscillation exciter acting on the tube actively to cause it to execute mechanical oscillations, for example, bending oscillations about an imaginary oscillation axis, with an instantaneous resonant frequency of the tube arrangement, and the oscillations are converted by means of at least one oscillation sensor reacting to movements of the at least one tube 11 into at least one oscillatory signal serving as measurement signal s1 for the measured variable and having at least one signal parameter, for example, a signal amplitude, a signal frequency or a phase angle, dependent on the measured variable. For the mentioned case, in which the measuring system, consequently the pressure device formed therewith, is a Coriolis, mass flow, measuring device, the measuring transducer includes at least two mutually spaced oscillation sensors for producing two oscillation signals s1, s2 having a mutual phase angle dependent on the mass flow rate.

The measuring transducer shown here is—such as quite usual in the case of commonly marketed measuring transducers of the type being discussed, the more so for such measuring transducers suitable for industrial measuring—and automation technology, not least of all also for measuring transducers of vibration-type, —implemented as a prefabricated, independent structural unit consequently directly insertable into the course of the respective pipeline and having a measuring transducer housing 100 mechanically coupled, respectively, on the inlet and outlet sides—here namely in the region both of the inlet end 100+ as well as also the outlet end 100#—with the tube arrangement and accommodating the tube arrangement, as well as also possibly thereto mounted add-on parts, such as e.g. oscillation sensors, respectively oscillation exciter, in a cavity, especially a cavity hermetically sealed relative to the surrounding atmosphere. For the typical case for pressure devices formed by means of an in-line measuring device, in which case the particular pressure device is to be assembled releasably with the pipeline, there can be provided, as indicated in FIG. 1, respectively 2, respectively directly evident from their combination, on the inlet side, namely in the region of the inlet end 100+ of the pressure device, a first connecting flange 13 for connection to a fluid supplying line segment of the pipeline and on the outlet side, namely in the region of the outlet end 100# of the pressure device, a second connecting flange 14 for a fluid removing line segment of the pipeline. The connecting flanges 13, 14 can, in such case, such as quite usual in the case of such pressure devices, not least of all also in the case of pressure devices formed by means of a measuring transducer of vibration-type, be integrated terminally into the measuring transducer housing 100.

Figure 3:
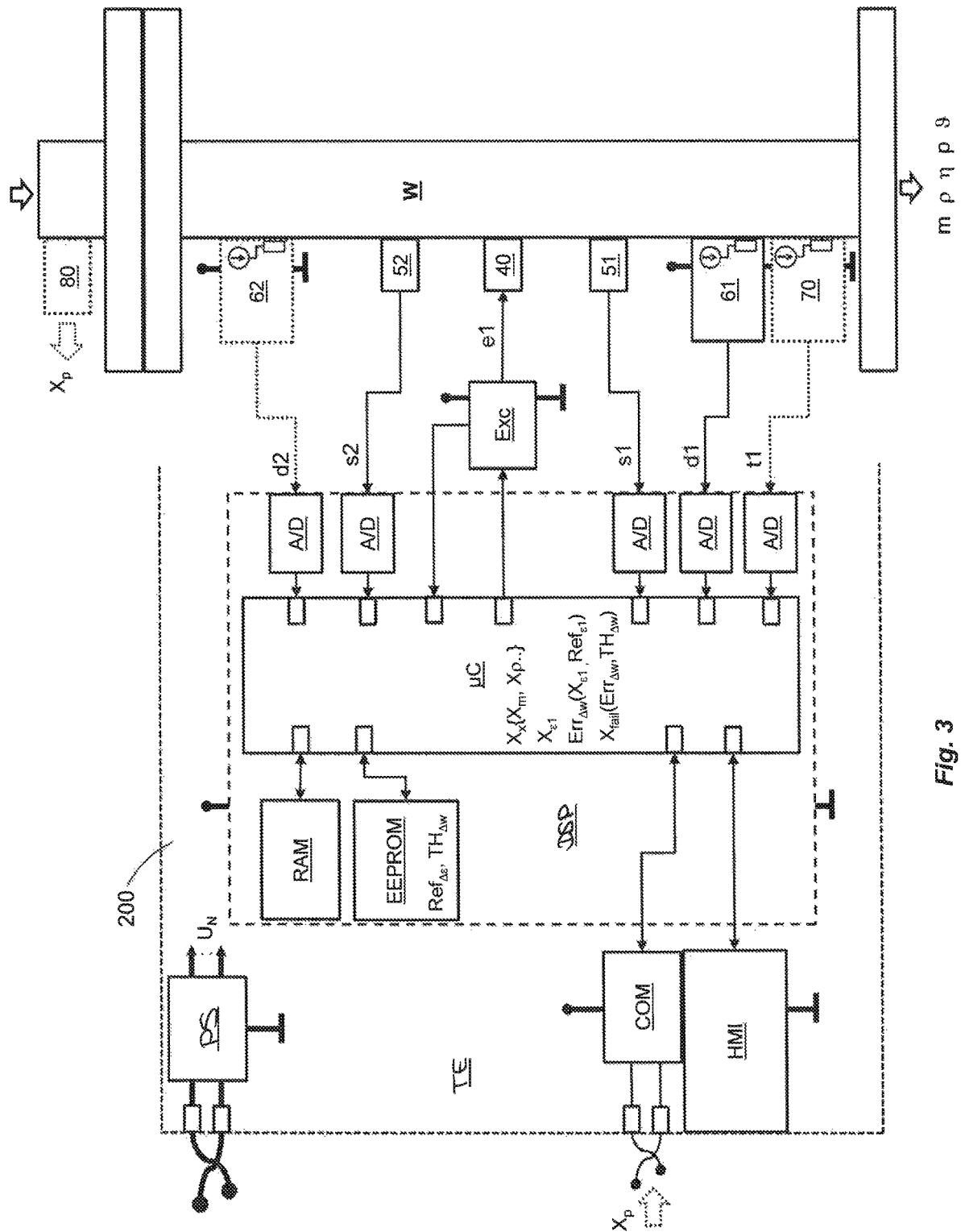
FIG. 3 schematically in the manner of a block diagram, a transmitter electronics with strain sensors connected to it for registering strains of a wall of a pressure device, especially a pressure device according to FIGS. 1, 2.

For evaluating the at least one measurement signal s1 dependent on the at least one measured variable, namely for producing at least one measured value representing the measured variable to be registered by applying the measurement signal, as well as, in given cases, also for activating the measuring transducer, the measuring system, consequently the pressure device formed therewith, includes, furthermore, a transmitter electronics TE electrically coupled with the measuring transducer MT, for example, also via an electrical connection line, and formed, for example, by means of one or more microprocessors, of which an example of an embodiment is shown in FIG. 3 schematically as a type of block diagram. The electrical connecting of the measuring transducer MT to the transmitter electronics TE can occur by means of corresponding connecting lines, which lead out from the electronics-housing 200, for example, by means of a pressure—and/or explosion resistant electrical cable feedthrough, respectively into the measuring transducer housing 100. The transmitter electronics TE can, such as schematically indicated in FIG. 1, respectively FIG. 3, and such as quite usual in the case of measuring systems of the type being discussed, be contained in an impact—and/or pressure resistant, for example, also explosion resistant, electronics-housing 200, which, such as shown, for example, also in the above mentioned US-A 2011/0265580 or US-A 2012/0123705, in forming an in-line measuring device of compact construction, can be held directly on the measuring transducer housing 100, for example, on a corresponding mounting nozzle 100' of the measuring transducer housing 100. In given cases, the mounting nozzle 100' can also accommodate the aforementioned electrical cable feedthrough. The transmitter electronics TE, for example, one supplied with electrical energy during operation externally via a connection cable and/or by means of an internal energy storer, can additionally, such as quite usual in the case of such measuring systems of industrial measuring—and automation technology, be electrically connected via corresponding electrical lines and/or wirelessly per radio with a superordinated electronic measurement data processing system arranged spatially removed, in given cases, also spatially distributed, from the transmitter electronics TE. During operation, measured values produced by the measuring system for the respective measured variable from a measured value signal correspondingly carrying the measured variable are forwarded near in time, for example, also in real time, to the superordinated electronic measurement data processing system.

The transmitter electronics TE communicating with the measuring transducer MT during operation, namely receiving its measurement signals s1, s2 and here additionally also driving the measuring transducer MT via driver signal e1, produces, in the example of an embodiment shown here, by applying the at least one measurement signal s1 repeatedly at least one measured value instantaneously representing the at least one measured variable x, for example, thus a mass flow, measured value $X_m$, a volume flow, measured value $X_v$, a density measured value $X_\rho$, and/or a viscosity measured value $X_\eta$. For such purpose, the transmitter electronics TE includes, as shown schematically in FIG. 3, a driver circuit Exc serving for driving the measuring transducer, here in the form of a measuring transducer of vibration-type, as well as a measuring—and evaluating circuit DSP for processing measurement signals s1, s2, of the measuring transducer MT and, for example, during operation, directly communicating with the driver circuit Exc. During operation, the measuring—and evaluating circuit DSP delivers measured values $X_x$ representing the at least one measured variable x. Each of the measurement signals $s_1$, $s_2$ delivered by the measuring transducer MT is fed via its own analog-to-digital converter A/D to the measuring—and evaluating circuit DSP in the example of an embodiment shown here implemented, for example, by means of a microprocessor µC and/or by means of a digital signal processor as well as by means of corresponding analog-to-digital converters A/D for digitizing the measurement signals, corresponding non-volatile memory EEPROM for the persistent storage of programs for the microprocessor and/or measuring—and operating data of the measuring system as well as corresponding volatile memory RAM for storing program code to be executed and/or digital measured values.

In the example of an embodiment shown here, the measuring—and evaluating circuit DSP of the transmitter electronics TE serves, among other things, also for applying the measurement signals $s_1$, $s_2$ delivered by the measuring transducer MT, for example, based on a phase difference detected between the measurement signals $s_1$, $s_2$, recurringly to ascertain a mass flow, measured value $X_m$, which represents a mass flow rate of the fluid flowing in the measuring transducer. Alternatively or supplementally for ascertaining the mass flow, measured value $X_m$, the transmitter electronics TE of the measuring system shown here can also serve, derived from an instantaneous oscillation frequency of the vibrating tube 11 ascertained based on the measurement signals s1, s2 or, for example, also based on the exciter signal e1, to produce a density measured value, which represents a density of the fluid flowing in the measuring transducer. Furthermore, the transmitter electronics TE can, such as quite usual in the case of such measuring systems, in given cases, also be used to ascertain a viscosity measured value $X_\eta$ representing a viscosity of the fluid flowing in the measuring transducer; compare, for this, also the above referenced U.S. Pat. Nos. 5,796,011, 7,284,449, 7,017,424, 6,910,366, 6,840,109, 5,576,500, or 6,651,513. Suited, in such case, for ascertaining the exciter energy or excitation power, respectively damping, required for determining the viscosity is, for example, the exciter signal delivered by the driver circuit of the transmitter electronics and/or also an internal control signal of the transmitter electronics serving for tuning the driver signal.

For visualizing, on-site, measured values $X_x$ internally produced by the measuring system and/or, in given cases, measuring system internally generated status reports, such as, for instance, an error report and/or an alarm, the measuring system can have, furthermore, communicating with the transmitter electronics TE, a display—and servicing element HMI, such as an LCD-, OLED- or TFT display, for instance, placed behind a correspondingly provided window in the electronics housing 200, plus a corresponding input keypad and/or touch screen. Moreover, provided in the transmitter electronics TE, for example, a re-programmable and/or remotely parameterable, transmitter electronics TE, are other electronic components serving the operation of the measuring system, such as, for instance, an internal energy, power supply circuit PS formed, for example, by means of a switching power supply, for providing internal supply voltages $U_N$, or also a communication circuit COM serving for connecting to a superordinated measurement data processing system and/or to a fieldbus. In advantageous manner, the communication circuit COM can, for example, also be adapted such that the transmitter electronics TE formed therewith can exchange with a electronic measurement data processing system superordinated to it, for example, a programmable logic controller (PLC), a personal computer and/or a process-control system measuring—and/or other operating data, such as, for instance, current measured values or tuning—and/or diagnostic values serving for control of the measuring system during operation, via a data transmission network—wired and/or radio-based—provided within the superordinated data processing system, for example, a fieldbus and/or industrial radio network. Additionally, for example, the internal energy supply circuit PS can also be fed during operation by an external energy supply provided in the data processing system.

Figure 4A:
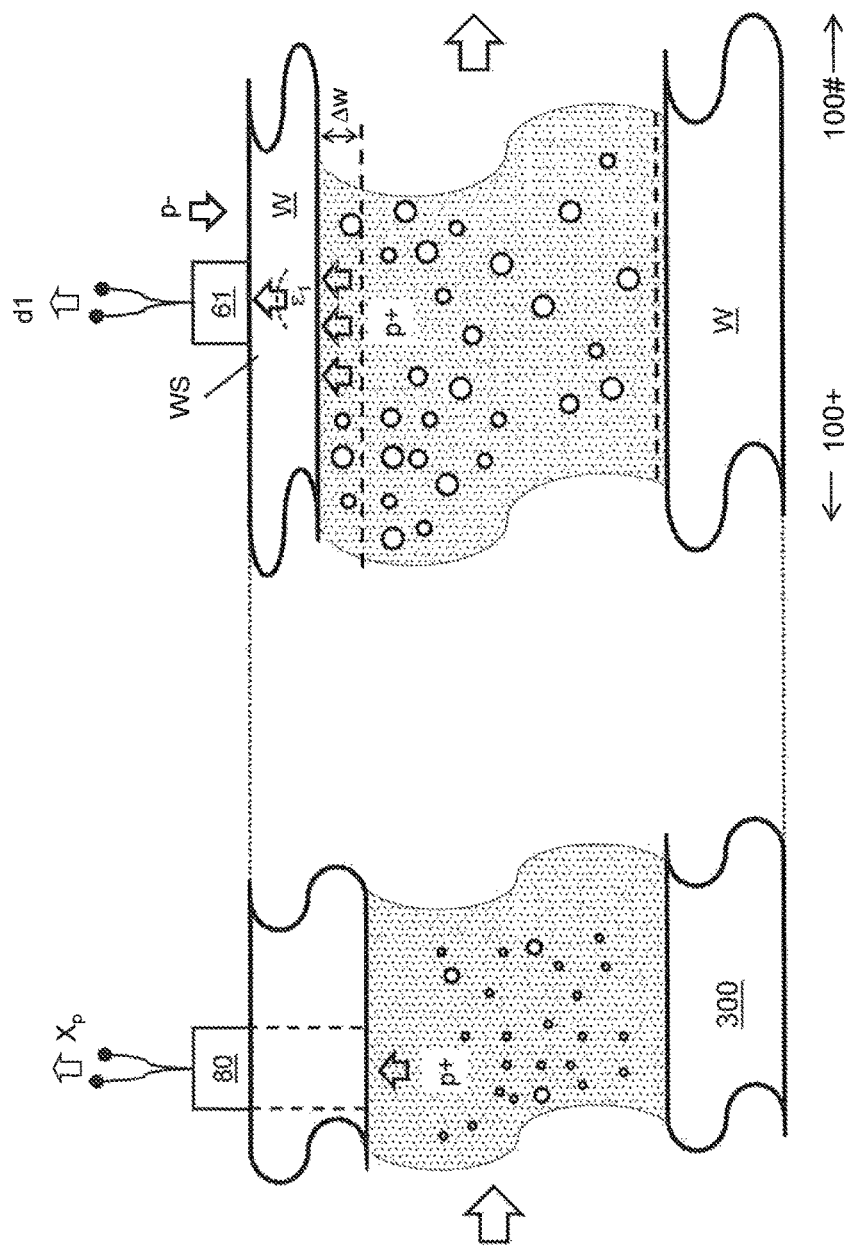
FIG. 4*a* schematically a strain sensor mounted to a wall of a pressure device, especially a pressure device according to FIGS. 1, 2, for registering a strain of a wall segment of the wall.

As already mentioned, the walls of pressure devices of the type being discussed can, as a result of overloadings, be it from operating the respective pressure device with process parameters exceeding earlier agreed, limit values—such as, for instance, a too high operating pressure, a too high operating temperature and/or a too high flow velocity—or also from supplying with a fluid unsuited for the pressure device, for example, a fluid abrading the wall and/or chemically attacking the wall, be damaged at least partially in considerable measure; this, in given cases, also in such a manner that the pressure device—, for instance, as a result of a plastic deformation of the wall and/or, as shown schematically in FIG. 4a, as a result of a wear Δw of the wall, namely a material removal from its surface facing the lumen, along with a lessening wall thickness of the wall—has then a lessened pressure resistance, respectively, in the case, in which the pressure device is embodied as a measuring system, then a lessened accuracy of measurement.

Figure 4B:
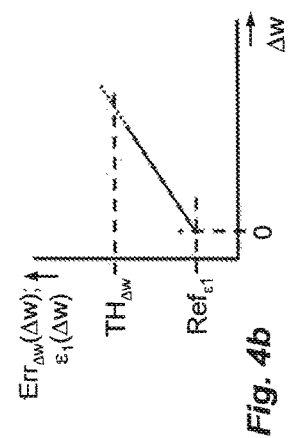
FIG. 4*b* qualitatively, dependence of a damage characterizing number quantifying damage to the wall versus extent of the damage to the wall.

In order as early as possible to be able to detect such damage to the wall W, for example, also already in a beginning stage, namely before the damage to the pressure device as regards its (still remaining) pressure resistance or, in given cases, as regards its (still remaining) accuracy of measurement has reached the critical stage, the measuring system, consequently the pressure device formed therewith, is, especially, also adapted to register a strain $_{\varepsilon 1}$ of the wall—in the example of an embodiment shown here, namely a local strain of a wall segment of the tube 11—and based thereon to ascertain a strain value $X_{\varepsilon 1}$ representing the strain of the wall, for example, also in the form of a time average. By exploiting a dependence inherent to the wall of the strain $_{\varepsilon 1}$ on the extent of damage to the wall in the case of a wear Δw, namely, for example, in such a manner that in the case of supplying the wall with a constant, respectively recurringly constant pressure, as shown in FIG. 4b by way of example, the strain $_{\varepsilon 1}$ rises with increasing wear Δw, so the measuring system is additionally adapted to ascertain damage to the wall by applying the strain value $X_{\varepsilon 1}$; this e.g. in such a manner that, based on a rise of the strain value $X_{\varepsilon 1}$ established in an observation time span and/or by ascertaining, respectively quantifying, a deviation of the strain value $X_\varepsilon$ from one or more predetermined reference values, such as, for instance, a desired value representing an undamaged wall and/or a threshold value representing an unallowably high strain, respectively a strain indicating a critical damage, a corresponding damage to the wall, is deduced. Such a reference value can be ascertained e.g. in the case of a calibration measurement undertaken for the pressure device in the manufacturer's plant and/or in the case of start-up on-site and thereafter stored in the transmitter electronics TE, for example, in the non-volatile memory EEPROM of the measuring—and evaluating circuit DSP; alternatively or supplementally, such a reference value can, however, also be ascertained for a structurally equal or at least type equal, other pressure device, for example, in the manufacturer's plant, and thereafter be correspondingly transmitted to the transmitter electronics, respectively to the transmitter electronics of other type-equal or equally constructed, pressure devices.

In another embodiment of the invention, it is, furthermore, provided, based on the ascertained damage, namely for the case, in which the damage exceeds a critical measure predetermined for the pressure device, to generate a corresponding warning report $X_{fail}$ signaling, namely, for example, also visually and/or acoustically perceivably, a critical damage to the wall. Critical damage can be, for example, a damage corresponding to a maximum allowable damage to the wall set earlier for the pressure device and/or a damage requiring an inspection of the pressure device. The warning report $X_{fail}$ can be produced in the example of an embodiment shown here by means of the measuring—and evaluating circuit DSP and output via display—and servicing element HMI and/or via communication circuit COM.

For registering the strain $_{\varepsilon 1}$ of the wall, the measuring system according to a embodiment of the invention comprises, furthermore, a strain sensor 61 affixed on a wall segment WS of the wall W—and formed, for example, by means of a resistive or piezoresistive, strain gage (SG)—for producing a strain signal d1 dependent on the strain of the wall segment WS. Strain signal d1 can, in such case, be e.g. an (initially) analog electrical signal having an electrical voltage dependent on the respectively registered strain and/or an electrical current dependent on the strain. The strain sensor can be formed, for example, by means of a strain gage (SG) adhered externally, namely on a surface of the wall segment WS facing away from the lumen, consequently, in each case, a surface not contacted by the fluid conveyed in the lumen. The strain gauge can have a predetermined nominal resistance value $R_0$ of, for example, 500Ω (ohm), and a predetermined sensitivity k (k-factor) of, for example, 100. The strain gage, which forms the strain sensor 61 and which, in given cases, is also held under pretension, can, in advantageous manner, furthermore, e.g. be so arranged that it primarily registers an azimuthal strain of the wall segment WS, namely corresponding to a circumference change, respectively oriented in a circumferential direction; alternatively thereto, the strain gage can, however, also be so arranged such that primarily an axial strain is registered therewith, namely strain oriented in a longitudinal direction of the lumen surrounded by the wall—in the example of an embodiment shown here, thus also in the flow direction. For producing the strain signal d1, the strain gage (SG) can be flowed through during operation by a load independent, consequently known, electrical current $I_{SG}$ driven by a constant current source, for example, a constant current source provided in the respective strain sensor, in such a manner that an electrical voltage $U_{SG1}$ falling across the strain gage serves as a strain signal d1. With knowledge of such a strain sensor's inherent dependence $U_{SG1}=I_{SG} \cdot R_0 (1+k \cdot _{\varepsilon 1})$ of the respective instantaneous voltage $U_{SG1}$: on the respective instantaneously registered strain $_{\varepsilon 1}$, the strain can also be directly ascertained numerically, consequently quantified. The strain sensor 61 is, as shown schematically in FIG. 2 or 3, respectively directly evident from their combination, electrically coupled with the transmitter electronics TE, here namely with its measuring—and evaluating circuit DSP, in this case via an analog-to-digital converter A/D serving for converting the strain signal d1 into a sampling sequence serving as digital strain signal. The strain value $X_{\varepsilon 1}$ can be ascertained based on the strain signal d1, for example, in that the measuring—and evaluating circuit DSP ascertains from the strain signal d1 at least one parameter measured value for a signal parameter characterizing the strain signal, not least of all, however, also as well as possible correlated with the naturally time variable strain $_{\varepsilon 1}$, for example, thus an instantaneous value of the strain signal. Serving as signal parameter can be, instead of the instantaneous value, in such case, however, also other location parameters, such as e.g. an effective value (RMS), and/or also scatter parameters, such as e.g. a variance of the strain signal. In accordance therewith, the measuring—and evaluating circuit DSP according to an additional embodiment is additionally adapted to ascertain the strain value $X_{\varepsilon 1}$ based on the strain signal d1, especially by means of the sampling sequence won therefrom, respectively to generate the strain value $X_{\varepsilon 1}$ as a measured value representing the strain $_{\varepsilon 1}$ digitally. It can be additionally advantageous, in such case, not least of all also for the case, in which the wall is exposed during operation to mentionable temperatures, namely temperatures, respectively time changes of the temperature, no longer negligibly influencing the strain signal delivered by the respective strain sensor, especially for the case, in which the strain sensor 61 is not temperature compensated, supplementally also to register a temperature of the wall, for instance, in the immediate vicinity of the wall segment WS1, for example, by means of a temperature sensor 70 having a platinum resistor and/or thermocouple adhered to a side of the wall W facing away from the lumen and delivering a corresponding temperature signal t1 to the measuring—and evaluating circuit DSP, and to ascertain damage to the wall also by applying the temperature signal t1, for example, in that the measuring—and evaluating circuit DSP based on the temperature signal t1 compensates possible temperature dependences of the strain signal d1, respectively correspondingly takes such into consideration in ascertaining the strain value $X_{\varepsilon 1}$.

Figure 5:
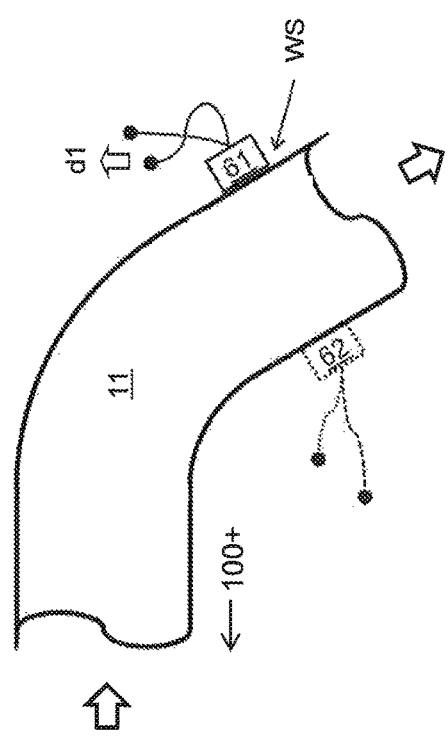
FIGS. 5 and 6 other variants for arranging two or more strain sensors on a wall of a pressure device, especially a pressure device according to FIGS. 1, 2.
Figure 6:
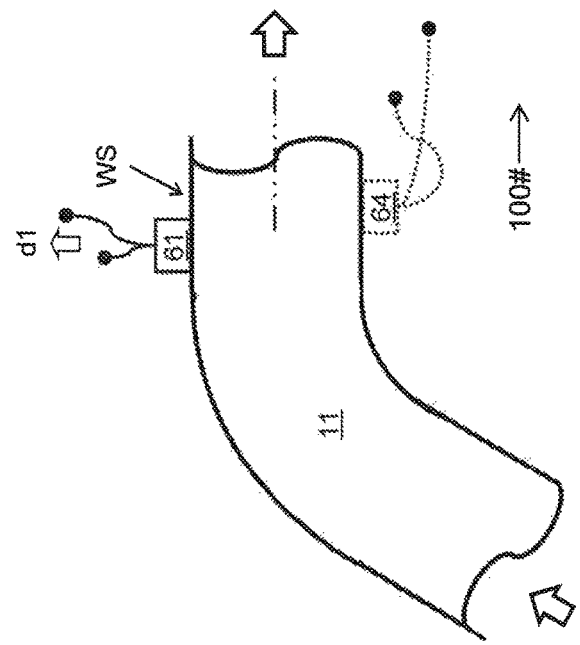
Figure 6:
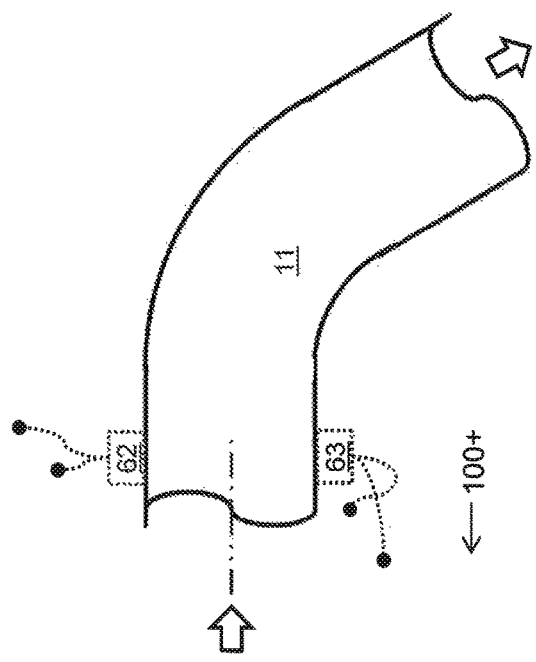

Fundamentally, there are in the case of pressure devices of the type being discussed a number of options for placing the strain sensor 61, consequently for correspondingly selecting the wall segment WS to be observed as regards its strain. For monitoring the respective pressure device, as already mentioned, for example, such wall segments are quite suitable, which react to loading scenarios typical for the particular pressure device and regularly with significant local damage, for example, in such a manner that the selected wall segment in the case of damage to the wall within a predeterminable observation time span is more quickly damaged than other wall segments, respectively at a predeterminable observation point in time is more strongly damaged than other wall segments of the wall. Mutually deviating local damage of pressure devices of the type being discussed can be, for example, damage to individual wall segments having damage scenarios different from one another and/or degrees of damage differing from one another. Wall segments suitable for monitoring the wall can in the case of pressure devices having a lumen through fluid flows during operation be, for example, wall segments, which, such as schematically indicated in FIG. 5, respectively 6, directly adjoin an arc shaped segment of the respective tube arrangement or an elbow formed therewith. Such an arrangement of the strain sensor 61 is not least of all also quite suitable for loading scenarios, in which an increased wear of the wall occurs as a result of a partial grinding off of the wall by a dispersion flowing at least, at times, in the lumen of the pressure device and/or in which plastic deformations of the walls happen. Thus, for example, dispersions, namely a disperse phase entrained in the respective medium, for example, thus solid particles entrained in a gas or, such as shown schematically in FIG. 4a, gas bubbles entrained in a liquid, tend to accumulate in the course of the respective flow, at times, amplified within certain regions, respectively the concentration in parts to increase, for instance, also due to cavitation, sedimentation or precipitation; this, especially, also in such a manner that—such as also schematically shown in FIG. 4a—with a certain regularity some of the wall segments of the wall—in FIG. 4a namely also the wall segment WS—are/is contacted principally by the dispersion medium, while other wall segments frequently, respectively to a stronger extent, are supplied with the dispersed phase, and, consequently, are damaged more strongly during operation. This effect is, especially, observed in the case of dispersions flowing in tube arrangements with sectionally curved tubes and/or in the case of abrupt cross sectional changes, for example, in the case of tube arrangements having a diffuser.

Although the monitoring the wall of the pressure device by registering the strain only of the wall segment WS, respectively by applying only one correspondingly placed strain sensor 61, can be implemented with sufficient accuracy, respectively safety, for most cases of application, it can, at times, nevertheless, be advantageous, respectively even required, for example, in order to be able to detect the degree of the respective damage more finely stepped, respectively in order to be able to register individual damage scenarios separately from one another and to evaluate such separately or in order to register a strain averaged over a greater spatial region, to register the strain at two or more wall segments significantly spaced from one another, namely by means of further correspondingly placed strain sensors 62, 63, respectively 64, and correspondingly to evaluate such by means of the respective measuring—and evaluating circuit DSP. The strain sensors, consequently the corresponding wall segments, can be arranged for this e.g. in the manner shown representatively in FIG. 5, respectively 6.

Especially, it can, in such case, be advantageous to arrange the strain sensors 61 and 62 such that the wall segment WS to be observed by means of the strain sensor 61 wears faster and/or after corresponding loading is worn more strongly than the wall segment to be observed by means of the strain sensor 62. Moreover, it is additionally also possible, instead of the constellations shown in FIG. 5, respectively 6, in which thus the tube arrangement includes each of the wall segments, of which a respective strain is registered for the purpose of ascertaining damage to the wall W, to locate at least one of the wall segments to be observed as regards strain outside of the tube arrangement, for example, by placing the corresponding strain sensor outwardly on a pipe, or tube, wall of a line segment of the connected pipeline supplying fluid to the measuring transducer or a line segment of the connected pipeline draining fluid from the measuring transducer.

In an additional embodiment of the invention, it is, furthermore, provided that damage to the wall is ascertained quantitatively by ascertaining a damage value $Err_{\Delta w}$, namely a characterizing number value for a damage characterizing number quantifying damage to the wall, based on the strain signal d1, respectively the strain value $X_{\varepsilon 1}$ as well as based on the, on a, correspondingly predetermined reference value $Ref_{\varepsilon 1}$, for example, a reference value $Ref_{\varepsilon 1}$ earlier furnished in the transmitter electronics TE. The damage characterizing number can e.g. be defined as an—absolute or relative—deviation of the strain value $X_{\varepsilon 1}$ from a corresponding, earlier ascertained, pressure device specific, reference value Refs. In advantageous manner, the damage characterizing number can, in such case, e.g. be so defined that, as shown simplified in FIG. 4b, the damage value $Err_{\Delta w}$ likewise increases with increasing damage. Said reference value $Ref_{\Delta \varepsilon}$ can correspond e.g. to a strain of the undamaged wall of the pressure device, respectively an intact wall segment thereof. In accordance therewith, the reference value $Ref_{\Delta \varepsilon}$ for the particular pressure device can be ascertained, for example, based on the strain signal d1 generated during a calibration measurement undertaken for the pressure device in the manufacturer's plant at nominal pressure and/or performed in the case of start-up on-site at predetermined or known operating pressure. Alternatively or supplementally, the reference value $Ref_{\Delta \varepsilon}$ can, for example, however, also be earlier calculated based on a strain ascertained for an equally constructed, other pressure device with undamaged wall or be ascertained based also on a pressure measurement performed within the plant formed by means of the pressure device. For the mentioned case, in which supplementally to the strain sensor 61 at least one further strain sensor 62 is provided spaced from the strain sensor 61 for registering a local strain of the wall W of the pressure device, the above mentioned reference value $Ref_{\varepsilon 1}$ can additionally also be calculated based on a strain signal generated by means of the strain sensor 62, and, for example, delivered to the measuring—and evaluating circuit DSP, respectively a further strain value $X_{\varepsilon 2}$ derived correspondingly from the strain signal and ascertained supplementally to the strain value $X_{\varepsilon 1}$ can be used as a reference value $Ref_{\varepsilon 1}$ ($X_{\varepsilon 2} \rightarrow Ref_{\varepsilon 1}$).

For the aforementioned case, in which the damage characterizing number is defined as a relative deviation of the strain ε1, respectively of the strain value $X_{\varepsilon 1}$ representing this, from the earlier ascertained, pressure device specific reference value $Ref_{\varepsilon 1}$, the damage value $Err_{\Delta w}$ can, for example, be so calculated by means of the measuring—and evaluating circuit DSP, consequently the transmitter electronics can, furthermore, be so adapted, that the particular damage value $Err_{\Delta w}$ fulfills the condition:

$$Err_{\Delta w} = 1 - \frac{X_{\varepsilon 1}}{Ref_{\varepsilon 1}}.$$

Alternatively or supplementally, the damage value $Err_{\Delta w}$ can, however, also be so calculated by means of the measuring—and evaluating circuit DSP, consequently the transmitter electronics TE can, furthermore, also be so adapted, that the damage value $Err_{\Delta w}$ fulfills the condition:

$$Err_{\Delta w} = Ref_{\varepsilon 1} - X_{\varepsilon 1},$$

and consequently corresponds to an absolute deviation of the strain value $X_{\varepsilon 1}$ from the associated reference value $Ref_{\varepsilon 1}$. The damage value $Err_{\Delta w}$ can hence also be used to ascertain whether or not damage to the wall has already taken place, respectively also to ascertain the extent of possible damage, which has, in the meantime, accumulated. Additionally, one can by means of the respectively current damage value $Err_{\Delta w}$, furthermore, also detect whether damage to the wall already corresponds to the critical damage to the wall earlier established for the particular pressure device, for example, by comparing the particular damage value $Err_{\Delta w}$ with a correspondingly predetermined, threshold value $TH_{\Delta w}$ representing the critical damage, this being done, for example, also directly in the measuring—and evaluating circuit DSP. Said threshold value $TH_{\Delta w}$ can be ascertained, for example, earlier by means of a type-equal or equally-constructed, other pressure device, which has, however, already damage classified as critical. Thus, its measuring—and evaluating circuit ascertains, especially also stores, at least one damage value $Err_{\Delta w}$ representing its instantaneous damage, and thereafter such is correspondingly furnished as threshold value $TH_{\Delta \varepsilon}$ in the measuring—and evaluating circuit DSP of the pressure device to be monitored, for example, also stored in the mentioned non-volatile memory EEPROM. To the extent that an exceeding, respectively subceeding, of the threshold value $TH_{\Delta w}$ is detected via the damage value $Err_{\Delta w}$, this can be correspondingly signaled, namely, for example, in the form of the mentioned warning report $X_{fail}$.

The strain of the wall segment WS required for ascertaining damage to the wall can e.g. be brought about by changing during operation of the pressure device a pressure difference (relative pressure $p_{rel}$) existing between a static internal pressure reigning within the lumen p+ and an ambient pressure p− acting externally on the wall, whereby at least portions of the wall, namely at least the wall segment WS, is elastically deformed. Since pressure devices of the type being discussed are, such as mentioned already multiple times, adapted to convey within the respective lumen a fluid, which has a pressure value p+ lying at at least 0.5 bar above the ambient pressure p−, it can directly be assumed therefrom that during operation of the respective pressure device regularly such a pressure difference is present, namely a pressure difference sufficient for ascertaining damage to the wall based on an elastic deformation of the wall; this not least of all also for the case shown in the example of an embodiment, in which the pressure device is formed by means of at least one measuring tube for conveying flowing fluid. In the case of a pressure device, through which fluid is flowing, it can additionally be directly assumed therefrom that alone the sending of fluid in and out of the pressure device means that a sufficiently increased pressure difference is present for detecting possible damage to the wall, respectively that it suffices for increasing the static internal pressure reigning within the lumen to the higher pressure value, as a rule, just to allow fluid to flow with the nominal operating pressure through the lumen of the pressure device. As already indicated, the pressure values for the internal pressure p+ in the case of pressure devices of the type being discussed, not least of all also in the case of pressure devices formed by means of at least one measuring tube for conveying flowing fluid, lie namely typically in normal operation at least at times clearly above 10 bar. For the other mentioned case, in which the wall of the pressure device has experienced a plastic, consequently not reversible, deformation, the strain $_{\varepsilon 1}$, respectively the strain signal d1 representing such, contains, besides a component fluctuating correspondingly with the elastic deformation of the wall following the pressure difference, consequently fluctuating with time, additionally, in each case, also a component largely independent of the instantaneous pressure difference, consequently a non-volatile component, whose degree corresponds to an extent of the plastic deformation of the wall plus a possible pretension of the strain sensor.

Since, on the one hand, the strain $_{\varepsilon 1}$ can have, besides a dependence on the extent of the damage also a dependence on the static pressure respectively acting on the wall, while, on the other hand, the pressure typically also fluctuates considerably with time, it is according to the invention, furthermore, provided, not least of all also in order safely to be able to prevent false alarms, to use, respectively to take into consideration, supplementally to the strain value $X_{\varepsilon 1}$ also a measured value of pressure $X_p$ representing a static internal pressure reigning within the lumen, for example, held in the non-volatile memory EEPROM and/or in the volatile memory RAM, for ascertaining damage to the wall. Said measured value of pressure $X_p$ can in the case of the measuring system shown here e.g. be input by a user via the display—and servicing element HMI on-site and/or transmitted during operation of the measuring system recurringly via the communication circuit COM to the measuring—and evaluating circuit DSP. The transmitter electronics TE is, in turn, furthermore, adapted, for example, by corresponding programming of the measuring—and evaluating circuit DSP, to process the strain signal d1 together with the presently measured value of pressure $X_p$ further, namely to ascertain based on the strain signal d1, respectively the digital strain signal derived therefrom, first of all, the strain value $X_{\varepsilon 1}$ and thereafter to ascertain the possibly present damage to the wall by applying both the strain value $X_{\varepsilon 1}$ as well as the pressure, measured value $X_p$. For the purpose of providing a precise, respectively reliable, ascertaining of damage to the wall even in the case of pressure fluctuating over a broad range, it is provided according to an additional embodiment of the invention, furthermore, by applying the measured value $X_p$ of pressure, to ascertain a strain desired value $X_{\varepsilon 1\_DES}$, which represents a nominal strain $_{\varepsilon 1,Ref}$ namely a strain 1,Ref corresponding to an instantaneous internal pressure, respectively the instantaneous pressure difference, in the case of undamaged wall. The strain desired value $X_{\varepsilon 1\_DES}$ can be ascertained very simply, for example, based on the calculational specification $X_{\varepsilon 1\_DES}=X_p \cdot K_p$, respectively $X_{\varepsilon 1\_DES}=X_p \cdot X_{\varepsilon 1,Ref}/X_{p,Ref}$, which is determined by the pressure, measured value $X_p$, as well as an original, respectively initial, pressure transmission factor $K_p$, namely a proportionality factor ($K_p=X_{\varepsilon 1,Ref}/X_{p,Ref}$) mediating between an initial strain measured value $X_{\varepsilon 1,ref}$ ascertained in the case of undamaged wall and a pressure, measured value $X_p$,Ref, representing a concurrently ascertained, static internal pressure. The pressure transmission factor $K_p$ is dependent, among other things, on the wall thickness as well as the modulus of elasticity of the undamaged wall, as well as its geometry, and can be ascertained for the pressure device metrologically e.g. in a calibration in the manufacturer's plant and/or at start-up on-site and thereafter stored in the transmitter electronics TE, for example, in the mentioned non-volatile memory EEPROM of the measuring—and evaluating circuit DSP. Alternatively or supplementally, the pressure transmission factor $K_p$ can, however, also be ascertained for a structurally-equal or at least equal type, other pressure device, for example, in the manufacturer's plant, and thereafter correspondingly transmitted to the transmitter electronics, respectively transmitter electronics of other type-equal or equally constructed, pressure devices. Based on the strain value $X_{\varepsilon 1}$ as well as the strain desired value $X_{\varepsilon 1\_DES}$, then in the measuring—and evaluating circuit DSP a discrepancy between the currently measured strain sc of the wall and the nominal strain $_{\varepsilon 1,Ref}$ can be ascertained, for example, in the form of a digital measured value representing the discrepancy, consequently indexing a possible damage to the wall. The measuring system, consequently the pressure device formed therewith, is according to an additional embodiment of the invention, consequently, furthermore, adapted, derived from the strain $_{\varepsilon 1}$ and from the internal pressure p+, respectively the pressure difference resulting therefrom, for example, thus based on the strain value $X_{\varepsilon 1}$ as well as the pressure, measured value $X_p$, to ascertain a strain deviation value $X_{\Delta\varepsilon}$ representing a discrepancy between the currently measured strain $_{\varepsilon 1}$ of the wall and the ascertained nominal strain $_{\varepsilon 1,Ref}$, for example, namely a difference $_{\varepsilon 1-\varepsilon 1,Ref}$ (respectively, $_{\varepsilon 1,Ref-\varepsilon 1}$), respectively a quotient $_{\varepsilon 1}/_{\varepsilon 1,Ref}$ (respectively. $_{\varepsilon 1,ref}/_{\varepsilon 1}$) between currently measured and ascertained nominal strain, as well as thereafter to use the, for example, also digital, strain deviation value $X_{\Delta\varepsilon}$ for ascertaining damage to the wall, for instance, by comparing the strain deviation value $X_{\Delta\varepsilon}$ with one or more earlier ascertained reference—and/or threshold values. For example, the measuring—and evaluating circuit DSP can be so adapted that it generates the strain deviation value $X_{\Delta\varepsilon}$ as a difference $X_{\varepsilon 1}-X_{\varepsilon 1\_DES}$ (respectively, $X_{\varepsilon 1\_DES}-X_{\varepsilon 1}$), respectively as a quotient $X_{\varepsilon 1}/X_{\varepsilon 1\_DES}$ (respectively, $X_{\varepsilon 1\_DES}/X_{\varepsilon 1}$) of the strain—and strain desired value $X_{\varepsilon 1}$, $X_{\varepsilon 1\_DES}$ and/or as a difference of the strain value $X_{\varepsilon 1}$ and of the strain desired value $X_{\varepsilon 1\_DES}$ normalized on the strain value $X_{\varepsilon 1}$, for example, in the form $(X_{\varepsilon 1}-X_{\varepsilon 1\_DES})/X_{\varepsilon 1}=1-X_{\varepsilon 1\_DES}/X_{\varepsilon 1}$, respectively $(X_{\varepsilon 1\_DES}-X_{\varepsilon 1})/X_{\varepsilon 1\_DES}$ or $1-X_{\varepsilon 1}/X_{\varepsilon 1\_DES}$. Alternatively or supplementally, the measuring—and evaluating circuit DSP can, furthermore, also be adapted, for the purpose of ascertaining damage to the wall during operation, to ascertain recurringly a quotient $X_{\varepsilon 1}/X_p$ (respectively. $X_p/X_{\varepsilon 1}$) of the strain value $X_{\varepsilon 1}$ and the pressure, measured value $X_p$, consequently to ascertain a current pressure transmission factor $K_p'$ and to compare this thereafter correspondingly with the mentioned pressure transmission factor $K_p=X_{\varepsilon 1,Ref}/X_{p,Ref}$ (respectively $1/K_p$), respectively to ascertain a deviation between the quotient $K_p'$ and the proportionality factor $K_p$. Moreover, the strain deviation value $X_{\Delta\varepsilon}$ can additionally also be used for ascertaining the damage value $Err_{\Delta w}$ ($Err_{\Delta w}=f[X_{\Delta\varepsilon}]$), respectively also be used directly as damage value $Err_{\Delta w}$ ($X_{\Delta\varepsilon}\rightarrow Err_{\Delta w}$).

In order to provide a pressure, measured value representing the instantaneous internal pressure, respectively the pressure difference dependent thereon, as exactly as possible, it is according to an additional embodiment of the invention, furthermore, provided, for the purpose of ascertaining damage to the wall, supplementally also to register, for example, absolutely or relatively to the ambient pressure, a static internal pressure reigning within the lumen and based thereon recurringly to acertain currently the measured value of pressure $X_p$, so that thus the measured value of pressure $X_p$, in each case, represents the instantaneous internal pressure as exactly as possible. Such an ascertaining of the measured value of pressure $X_p$ can occur e.g. by registering, first of all, by sensor—such as also shown schematically in FIG. 1—the internal pressure, respectively a pressure difference (relative pressure) existing between such and the ambient pressure by means of an (absolute—, respectively relative—) pressure sensor 80 inserted—here upstream of the wall segment WS—into the wall and correspondingly calculating the particular pressure, measured value $X_p$, and thereafter the respective currently ascertained pressure, measured value $X_p$ is output by the pressure sensor 80 and transmitted, e.g. via communication circuit COM or by means of HART multidrop, to the measuring—and evaluating circuit DSP. The pressure sensor 80 can, for this purpose, be connected, for example, directly to the transmitter electronics, for example, to its communication circuit COM, or, however, transmit the respective pressure, measured value $X_p$ to the mentioned superordinated measurement data processing system, from where the pressure, measured value $X_p$ can be thereafter correspondingly further communicated to the transmitter electronics. For the case, in which pressure sensor 80 and wall segment WS are arranged widely removed from one another and/or the fluid has a high compressibility, it can, at times, be required correspondingly to convert the internal pressure registered by means of the pressure sensor taking into consideration a flow velocity, respectively a mass flow rate, for example, based on the pressure-measuring—, respectively correction, method disclosed in the above mentioned US-A 2011/0161018 or WO-A 2004/023081, so that the pressure, measured value $X_p$ represents as exactly as possible the pressure, respectively the pressure difference established therewith, actually acting on the wall segment WS. For the mentioned case, in which the pressure device is formed by means of an in-line measuring device for measuring a mass—, respectively volume, flow rate, the required flow velocity, respectively the mass flow rate, can be directly measured and correspondingly taken into consideration in the case of ascertaining damage to the wall.

The aforementioned calculatory functions, especially also those respectively serving for producing the damage value $Err_{\Delta\epsilon}$ and/or the alarm $X_{fail}$, respectively others of the aforementioned measured values, can be implemented very simply e.g. by means of the above mentioned microcomputer of the measuring—and evaluating circuit DSP or, for example, also a digital signal processor correspondingly provided therein. The creation and implementation of corresponding algorithms, which fit the above-described formulas, as well as their translation into program code correspondingly executable in the transmitter electronics TE are topics known, per se, to those skilled in the art and need, consequently, —, in any event, with knowledge of the present invention—no detailed explanation. Of course, the aforementioned formulas, respectively other functionalities of the measuring system implemented with the transmitter electronics TE, respectively the pressure device formed therewith, can also be implemented in the transmitter electronics TE quite directly or partially by means of corresponding discretely constructed and/or hybrid, thus mixed analog-digital, calculational circuits.

The invention claimed is:

1. A method for monitoring and/or checking a pressure device including a wall and a lumen surrounded by said wall, namely a device for conveying and/or storing a fluid in the lumen, said method comprising:

registering a strain of the wall, for ascertaining a strain value representing strain of the wall;

registering a static internal pressure reigning within the lumen for ascertaining a measured value of pressure representing the static internal pressure reigning within the lumen for ascertaining damage to the wall; and using both, the strain value as well as the measured value of pressure for ascertaining damage to the wall, said ascertaining damage to the wall including:

using the measured value of pressure for ascertaining a reference value, and using the strain value and the reference value for ascertaining a damage value, namely a characterizing number value for a damage characterizing number quantifying damage to the wall, said damage value representing a deviation of the strain value from the reference value.

2. The method as claimed in claim 1, further comprising:
modifying a pressure difference, existing between a static internal pressure reigning within the lumen and an ambient pressure acting externally on the wall for elastically deforming at least portions of the wall, namely at least one wall segment of the wall.

3. The method as claimed in claim 2, wherein:
said changing the pressure difference comprises increasing the static internal pressure to a pressure value, which is greater than the ambient pressure.

4. The method as claimed in claim 3, wherein:
said changing the pressure difference comprises allowing flow of fluid from the lumen of the pressure device.

5. The method as claimed in claim 2, wherein: said changing the pressure difference comprises: allowing flow of fluid into the lumen of the pressure device.

6. The method as claimed in claim 2, wherein said changing the pressure difference comprises: allowing flow of fluid through the lumen of the pressure device.

7. The method as claimed in claim 3, wherein said changing the pressure difference comprises: increasing the static internal pressure to a pressure value, which is greater than the ambient pressure by more than 10 bar.

8. The method as claimed in claim 1, further generating a warning report, which signals a critical damage to the wall.

9. The method as claimed in claim 8, wherein:
said generating the warning report comprises using the pressure, measured value.

10. The method as claimed in claim 9, wherein:
said generating the warning report comprises both using the strain value and using the pressure, measured value.

11. The method as claimed in claim 8, wherein:
said generating the warning report comprises using the strain value.

12. The method as claimed in claim 8, wherein:
said generating the warning report comprises comparing the damage value with a predetermined threshold value.

13. The method as claimed in claim 1, wherein:
the pressure device comprises a measuring transducer, which measuring transducer is adapted to register at least one measured variable of the fluid and to transduce such into at least one measurement signal corresponding to the measured variable.

14. The method as claimed in claim 13, wherein:
the pressure device comprises, coupled electrically with the measuring transducer, a transmitter electronics, said transmitter electronics being adapted to receive the at least one measurement signal; and said transmitter electronics being adapted, by applying the measurement signal, to ascertain at least one measured value, which represents the at least one measured variable.

15. The method as claimed in claim 14, wherein:
said ascertaining damage to the wall is executed by applying the transmitter electronics.

16. The method as claimed in claim 13, wherein:
measuring transducer includes a tube arrangement for conveying the flowable medium; and
the lumen of the pressure device is formed by said tube arrangement.

17. The method as claimed in claim 16, wherein:
the tube arrangement includes the wall segment.

18. The method as claimed in claim 1, wherein:
said damage characterizing number represents a deviation of the strain difference from an earlier ascertained reference value.

19. The method as claimed in claim 18, wherein:
said ascertaining damage to the wall comprises using the damage value.

20. The method as claimed in claim 18, wherein:
the damage value represents a deviation of the strain value from a reference value.

21. The method as claimed in claim 18, further comprising:
using the strain desired value for ascertaining the damage value.

22. The method as claimed in claim 1, further comprising:
producing at least one strain signal dependent on a time variable strain of the wall segment.

23. The method as claimed in claim 22, further comprising:
using a strain gage affixed on the wall segment for producing the at least one strain signal.

24. The method as claimed in claim 23, wherein:
for ascertaining the strain value from the strain signal at least one parameter measured value is ascertained for a signal parameter characterizing the strain signal.

25. The method as claimed in claim 22, further comprising: using the at least one strain signal for ascertaining the strain value.

26. The method as claimed in claim 1, further comprising:
ascertaining a strain desired value representing a nominal strain of the wall.

27. The method as claimed in claim 26, further comprising:
using the strain value as well as the strain desired value for ascertaining a strain deviation value representing a discrepancy between the strain of the wall and the nominal strain.

28. The method as claimed in claim 27, further comprising:
using the strain deviation value for ascertaining damage to the wall.

29. The method as claimed in claim 1, further comprising:
registering a static internal pressure reigning within the lumen for ascertaining the measured value of pressure.

30. The method as claimed in claim 29, wherein:
said step registering the static internal pressure reigning within the lumen comprises using a pressure sensor inserted into the wall.

31. The method as claimed in claim 1, wherein:
said ascertaining damage to the wall comprises using the strain value for ascertaining a deviation of the strain value from an earlier ascertained reference value.

32. The method as claimed in claim 1, wherein:
said ascertaining the strain desired value comprises using the measured value of pressure.

33. The method as claimed in claim 1, wherein:
said ascertaining damage to the wall comprises registering a temperature of the wall.

34. The method as claimed in claim 1, wherein:
the pressure device comprises at least one of:
a pipeline,
a tank, and
a boiler.

35. The method as claimed in claim 1, further comprising:
allowing fluid to flow into the lumen of the pressure device.

36. The method as claimed in claim 1, further comprising:
allowing flow of fluid through the lumen of the pressure device for increasing a static internal pressure reigning within the lumen to a pressure value higher than ambient pressure.

37. The method as claimed in claim 1, further comprising:
allowing flow of fluid from the lumen of the pressure device.

38. A measuring system for ascertaining measured values representing at least one measured variable, said measuring system comprising:
a pressure device including a wall and a lumen surrounded by said wall, namely a device for conveying and/or storing a fluid in the lumen;
at least one strain sensor affixed on a wall segment of said wall for producing a strain signal dependent on a time variable strain of said wall segment;
a transmitter electronics electrically coupled with the strain sensor, and
a pressure sensor for ascertaining a measured value of pressure representing a static internal pressure reigning within the lumen, said pressure sensor being adapted to transmit said measured value of pressure;
the transmitter electronics being adapted to receive the strain signal as well as, with application of the strain signal and the measured value of pressure, to ascertain damage to said wall.

39. The measuring system as claimed in claim 38, wherein:
said transmitter electronics is adapted, by applying the strain signal, to generate a strain value representing strain of said wall; and
said transmitter electronics is adapted, by applying the strain value, to ascertain damage to said wall.

40. The measuring system as claimed in claim 39, wherein:
said transmitter electronics is adapted, for generating the strain value, to ascertain for a signal parameter characterizing the strain signal.

41. The measuring system as claimed in claim 40, wherein:
said transmitter electronics is adapted to ascertain a parameter measured value of at least one location parameter for the strain signal.

42. The measuring system as claimed in claim 38, wherein:
said transmitter electronics is adapted, based on the strain signal, to ascertain a damage value, namely a characterizing number value for a damage characterizing number quantifying an instantaneous damage to said wall.

43. The measuring system as claimed in claim 42, wherein:
the damage value represents a deviation of the strain value from a reference value ascertained therefor.

44. The measuring system as claimed in claim 42, wherein:
said transmitter electronics is adapted to compare the damage value with a predetermined threshold value for ascertaining damage to said wall.

45. The measuring system as claimed in claim 38, wherein:
said pressure device comprises a measuring transducer, including a tube arrangement formed by at least one tube for conveying the fluid, which measuring transducer is adapted to deliver at least one measurement signal corresponding to the measured variable; and
the lumen of the pressure device is formed by means of said tube arrangement.

46. The measuring system as claimed in claim 45, wherein:
said at least one strain sensor is affixed on the at least one tube of said tube arrangement; and/or
said tube arrangement of said measuring transducer has at least two tubes, especially tubes for parallel flow and/or four and/or equally constructed, tubes.

47. The measuring system as claimed in claim 45, wherein: said tube arrangement of said measuring transducer includes at least two tubes.

48. The measuring system as claimed in claim 38, wherein:
said transmitter electronics is electrically coupled with said measuring transducer.

49. The measuring system as claimed in claim 48, wherein:
said transmitter electronics is adapted to receive the at least one measurement signal as well as, by applying the measurement signal, to ascertain a measured value, which represents a physical measured variable of the fluid.

50. The measuring system as claimed in claim 48, wherein: said transmitter electronics is adapted to deliver at least one electrical driver signal for driving said measuring transducer.

51. The measuring system as claimed in claim 38, wherein:
said transmitter electronics is adapted, based on the strain signal to generate a warning report signaling the damage.

52. The measuring system as claimed in claim 51, wherein:
said transmitter electronics is adapted to generate said warning report, in case a damage value ascertained based on the strain signal exceeds a predetermined threshold value.

53. The measuring system as claimed in claim 38 wherein the pressure sensor is inserted into said wall upstream of said wall segment.

* * * * *